United States Patent [19]
Wenxing

[11] Patent Number: 4,793,979
[45] Date of Patent: Dec. 27, 1988

[54] PROCESS FOR CHEMICAL SEPARATION OF PHOSPHORUS ORE

[75] Inventor: Lu Wenxing, Xian, China

[73] Assignees: Shaaxi Chemical and Fertilizer Industry Company, Xian, China; Kemira Company of Finland, Helsinki, Finland

[21] Appl. No.: 841,853

[22] Filed: Mar. 20, 1986

[30] Foreign Application Priority Data

Apr. 1, 1985 [CN] China ............................. 85100187

[51] Int. Cl.⁴ ...................... C01F 1/00; C01F 5/00; C01B 25/16
[52] U.S. Cl. ................................ 423/167; 423/127; 423/144; 423/158; 423/319; 71/33
[58] Field of Search ................ 423/167, 321 R, 319, 423/431, 158, 127, 144; 71/33

[56] References Cited

U.S. PATENT DOCUMENTS

| | | | |
|---|---|---|---|
| 3,653,872 | 4/1972 | Guery | 423/167 |
| 3,886,259 | 5/1975 | Nikolai et al. | 423/167 |
| 3,919,395 | 11/1975 | Hauge | 423/167 |
| 4,012,491 | 3/1977 | Hauge | 423/167 |

OTHER PUBLICATIONS

Van Wazer, Phosphorus and it's Compounds, vol. 11, 1961, p. 977.
Chemical Enrichment of Karatau Phosphorite Ore, Nikandrov, I.S., abstracts only.
Enrichment of Low-Grade Magnesium Containing Karatau Phosphorite Ores with Coarse Particle Sizes, Makhmudov, A., abstracts only.

Primary Examiner—Gregory A. Heller
Attorney, Agent, or Firm—Ladas & Parry

[57] ABSTRACT

The present invention is depicting a chemical separation of phorphorus ore. Phosphorus ore, especially calcareous and clacareous-sillicious phosphorus ore can be effectively converted into several products through chemical separation, which consists of two stages, namely ore pulp reaction and solution regeneration. In the first stage, phosphorus ore is disolved by mixed ammonium salts solvent, but the valence minerals, such as fluoride apatite and quartz don't take part in the reaction and retain their solid state. Thus phosphorus concentrate can be obtained through the separation, the by-products such as the filtrate and gases can be utilized in the solution regeneration. After ammoniation, sulfurization, carbonization and alkalization of the filtrate, the $Ca^{2+}$, $Mg^{2+}$, $Fe^{3+}$, $Al^{2+}$, $M^{2+}$ ions in it will gradually come out and turn into products, the regenerated solution obtained can be used again and again, thus forming a complete enclosed circulation process.

30 Claims, 1 Drawing Sheet

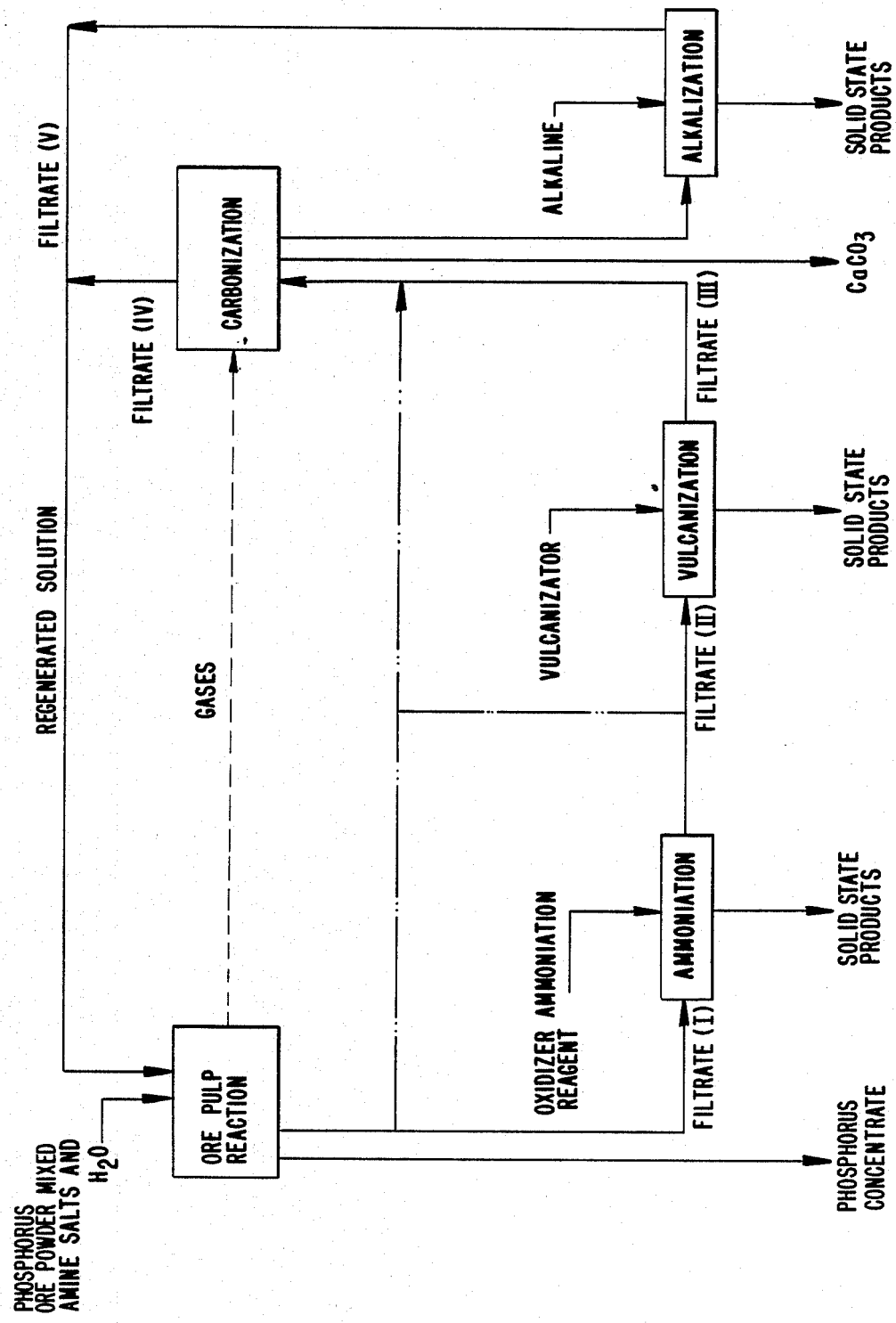

PROCESS FOR CHEMICAL SEPARATION OF PHOSPHORUS ORE

BACKGROUND OF THE INVENTION

The present invention relates to a chemical process for multiple utilization of phosphorus ore. More specifically, the process of this invention is especially suitable for dealing with calcareous and calcareous-silicious colloidal phosphorus ore.

Current processes for dressing phosphorus ore involve at least one of the following operations: grading, floatation and roasting Normally the combined ore dressing process is adopted. For dressing calcareous colloidal phosphorus ore, the roast process is preferred (see, for example "Using Roast Process in Concentrated Dolomitic Phosphorus Lump Rock Tailings to Produce Light Quality Magnesium Carbonate". "Chemical Mining Technology" June, 1981; P35 China, and "A Summary on medium scale test of phosphorus ore concentration in He Jia Yan, Shaanxi Province", "Chemical Fertilizers and Catalysts", January 1975; p22, China), the tailing thus obtained, however, has a lime white appearance and a high degree of alkalinity (pH=12), creating pollution to the environment, and has an MgO content of 2.5%; the recovery of $P_2O_5$ is 78–80%. In order to solve the technical problems in dressing the colloidal phosphorus ore, research has been carried out on chemical ore dressing in the Soviet Union and other countries since 1970s. It is reported that the research undertaken in the Soviet Union is a concentration process by using acid or a sole amine salt to remove $MgCO_3$ from calcareous colloidal phosphorus ore (see also "The chemical Concentration of Ka La Tao phosphorus ore", Chimical Abstracts 1977, 86, 92552h. The original artical was published on the "Proceedings of the 9th Inorganic Miniral Fertilizer Conference of the National Science and Technology of the Soviet Union" January 1974. p16–17; "The Concentration of coarse partical, magnisium-eontaining Ka La Tao phosphorus ore", which was cited in the s̃ame publications as mentioned above). Among all these processes using acid to treat the ore the loss of $P_2O_5$ is 7–12%; while using amine salt only, the percentage of magnisium removal is low, the MgO content in the phosphorus concentrate being higher then 1.5%. Thus it fails to realize the multipal utilization of the ore, the regeneration and circulation of the solution. In Japan inorganic acids or amine salts are used to treat the phosphorus ore (see also "The treatment of carbonate apatite", which was published in Japanese opened patent application No. 76718 6, 22nd, June, 1976), it is a direct method for producing combined fertilizer.

Up to now, no success has been reported in increasing the recovery of $P_2O_5$, while dressing the colloidal phosphorus ore and reducing the MgO content in phosphorus concentrate, so as to enable the multiple utilization of the ore as well as the prevention of environmental pollution, etc.

The present invention provides a new approach, i.e. to dress the phosphorus ore with an aqueous solution of mixed ammonium salts, and set up, at the same time, a complete enclosed circulation process for by-products recovery and solution regeneration.

It results in the unexpected obtaining of high quality phosphorus concentrate and by-products, the multiple utilization of the ore, increased recovery of $P_2O_5$ and solution regeneration without producing tailing, waste gas and water. Thus, it solves the colloidal phosphorus ore dressing problems which remained unsettled for quite a long time.

SUMMARY OF THE INVENTION

The primary objective of the invention is related to a process for a comprehesive removeal and recovery of $Fe_2O_3$, $Al_2O_3$, $CaCO_3MgCo_3$, MnO and etc in the colloidal phosphorus ore and the production of phosphorus concentrate. The process includes the following steps:

(a) effecting an ore pulp reaction by using two or more mixed aqueous ammonium salts together with phosphorus ore powder under heating, normal pressure or increased pressure and stirring to obtain solid, liquid and gas products;

(b) adding oxidizer, under normal temperature or heating in combination with agitation, into the filtrate produced from the ore pulp reaction, then adding an ammoniation reagent for ammoniation until the oxidization is completed and then filtering it;

(c) Under normal temperature or heating conditions, adding a sulfurizing agent to the filtrate passing through the ammoniation step for sulfurization after which it is again filtered;

(d) Under normal temperature or heating conditions, passing the gas obtained from step (a) into the filtrate after the vulcanization for carbonization, then again filtering; and (e) Under heating conditions, adding an alkaline substance to react with the filtrate after the corbonization, adding acid to it after refiltration to bring the pH to 7–8, to regenerate the solution obtained.

The second objective is related to a process for mainly removing and recovering $CaCO_3$ from the colloidal phosphorus ore to get phosphorus concentrate. The process includes the following steps:

(a) Using two kinds or more than two kinds of mixed ammonium salts in aqueous solution together with phosphorus ore powder to undertake an ore pulp reaction under heating, normal pressure or increased pressure in combination with agitation to produce solid, liquid and gas products;

(b) introducing gas obtained from step (a), under normal temperature or heating conditions, continuously into the filtrate produced from the ore pulp reaction to effect carbonization.

The third objective of the invention is related to a process for removing and recovering arbitrarily one or several impurity minerals from collodial phosphorus ore to get phosphorus concentrate.

DETAILED DESCRIPTION OF THE INVENTION

The present invention is to treat colloidal phosphorus ore, mainly calcareous and calcareous-silieious colloidal phosphorus ore. Compared with the existing technological processes, the main advantage of the present invention lies in the completeness of the chemical process, by using which to treat colloidal phosphorus ore, apart from phosphorus concentrate, we can also remove and recover in sequence $Fe_2O_3$, $Al_2O_3$, $CaCO_3$, $MgCO_3$, MnO and other impurities from the colloidal phosphorus ore. The chemical separation process of phosphorus ore in the invention consists of two stages, i.e. ore pulp reaction and solution regeneration. The latter stage includes four steps, namely ammoniation, sulfurization, carbonization and alkalization. Each step has its own particular technological objective e.g. ammoniation step is designed to recover $Fe^{3+}$ and $Al^{3+}$ ions. Therefore, the step could be skipped if the content of $Fe^{3+}$ and $Al^{3+}$ is too low. This is the same to all other steps. Thus, the determination of a particular process can be made according to the components of the colloidal phosphorus ore, any step can be arbitrarily connected with others, forming a complete enclosed flow process. This is one of the outstanding features of the invention. Another feature of the invention is the using of an aqueous solution of mixed ammonium salts as solvent, which presents remarkable advantages over the using of an aqueous solution of a single ammonium salt in the existing technology some impurities in the phosphorus ore have a very strong solubility in an aqueous solution of mixed ammonium salts, thus it can reduce the impurity content in the phosporus concentrate. By adopting the process in the invention, various technological specifications can be achieved. MgO content in the phosphorus concentrate is lower than 1%, normally around 0.5%; phosphorus recovery can reach 99.27% 99.86%, the utilization ratio of the phosphorus ore is higher than 90%, the regeneration rate of the solution can reach 99%. Multiple-utilization of the ore can be realized and no tailing, waste gas or water produced.

The detailed description of the whole process of phosphorus ore chemical separation is as floows:

1. Ore pulp reaction

Two or more than two kinds of ammonium salts, which might be $NH_4NO_3$, $NH_4Cl$, $(NH_4)_2HPO_4$, $NH_4H_2PO_4$, $NH_4HCO_3$ and $NH_4I$ are mixed. The preferred mixture is $NH_4Cl$ and $NH_4NO_3$ in a weight ratio of 0.5–10:1, with a preferred range of 3–5:1. Using water as solvent an aqueous is prepared with a concentration of 5–25% mixed ammonium salts, the preferred concentration is 12 20%. This is mixed with −20 to −200 w ([U.SS STANDARD ANSI/ASTME 11-1970(77)]. The ore is normally −50 to −150 w, the preferred range being −80 to −100 w phosphorus powder and when mixed with the aqueous solution of mixed ammonium salts forms a thick paste. The weight ratio between the phosphorus powder and the an aqueous solution of mixed ammonium salts is 1:2–10, with a preferred ratio range of 1:5–8. The thick paste thus prepared is heated to 100°–200° C. or preferably to 140°–180° C., and kept under mechanical agitation or steam agitation for 30 minutes to 8 hours, or preferably, for 0.5–4 hours. As the reaction proceeds, gases, such as $NH_3$, $CO_2$ are released. After the reaction all the gangue material impurities, such as dolomite, calcite and the oxides of iron, aluminium and manganese in the ore are dissolved, the valence minirals such as apatite $[Ca_5(PO_4)_3F]$ and quartz, or silinates, however, do not take part in the reaction and remain their solid state.

When the ore pulp reaction is carried out using aqueous solution of the mixture of $NH_4Cl$ and $NH_4NO_3$, the main chemical reactions are as follows:

$$CaCO_3 + 2NH_4Cl \rightleftharpoons CaCl_2 + 2NH_3 \uparrow + CO_2 \uparrow H_2O$$

$$MgCO_3 + 2NH_4Cl \rightleftharpoons MgCl_2 + 2NH_3 \uparrow + CO_2 \uparrow + H_2O$$

$$MnCO_3 + 2NH_4Cl \rightleftharpoons MnCl_2 + 2NH_3 \uparrow + CO_2 \uparrow + H_2O$$

$$MnO + 2NH_4Cl \rightleftharpoons MnCl_2 + 2NH_3 \uparrow + H_2O$$

$$Mn_3O_4 + 8NH_4Cl \rightleftharpoons 3MnCl_2 + 8NH_3 \uparrow + Cl_2 \uparrow + 4H_2O$$

$$Fe_2O_3 + 6NH_4Cl \rightleftharpoons 2Fcl_3 + 6NH_3 \uparrow + 3H_2O$$

$$Al_2O_3 + 6NH_4Cl \rightleftharpoons 2Alcl_3 + 6NH_3 \uparrow + 3H_2O$$

$$MgCO_3 + 2NH_4NO_3 \rightleftharpoons Mg(NO_3)_2 + 2NH_3 \uparrow + CO_2 \uparrow + H_2O$$

$$CaCO_3 + 2NH_4NO_3 \rightleftharpoons Mg(NO_3)_2 + 2NH_3 \uparrow + CO_2 \uparrow + H_2O$$

$$Fe_2O_3 + 6NH_4NO_3 \rightleftharpoons 2Fe(NO_3)_3 + 6NH_3 \uparrow + 3H_2O$$

$$Al_2O_3 + 6NH_4NO_3 \rightleftharpoons 2Fe(NO_3)_3 + 6NH_3 \uparrow + 3H_2O$$

As gases and water produced in the above reactions, all the reactions can be carried through to the end.

2. Solution regeneration.

Apart from the phosphorus concentrate, two kinds of by-products i.e. filtrate and $NH_3$, $CO_2$ gases released during the reaction can obtained after the ore pulp reaction. These two by-products are the main raw materials for solution regeneration.

According to the products needed to be removed and recovered, the solution regeneration can include any of the following steps.

(1) ammoniation

The filtrate obtained from the ore pulp reaction is pumped into a reaction vessel with an agitator which runs at 70–80 rpm. The reaction takes place at room temperature or heating conditions, the prefered temperature is 50°–60° C., An oxidizing agent is added to convert $Fe^{2+}$ in the solution into $Fe^{3+}$. The preferential oxidizing agent is industrial is normally bleaching powder $[(Ca(ClO)_2]$, the guantity employed that needed theoretically for oxidizing the $Fe^{2+}$ ion. After thorough reaction, ammoniation reagent is added, preferably in the form of aqueous ammonia in the amount necessary to adjust the pH of the reaction solution to 7–8. Then the reaction is carried out for further 20–40 minutes. After filtration, the usable main components, $Fe(OH)_3$, $Al(OH)_3$ are removed and; the filtrate is delivered for sulfurization.

The main reaction in this step are:

$$Ca(ClO_2) + 4Fe^{2+} + 4H^+ = Cacl_2 + 4Fe^{3+} + 2H_2O$$

$$Fe^{3+} + 3OH^- = Fe(OH)_3 \downarrow$$

$$Al^{3+} + 3OH^- = Al(OH)_3 \downarrow$$

(2) Sulfurization

The filtrate from the ammoniation stage is pumped into a vessel with an agitator. The reaction takes place under normal temperature or heating conditions with the prefered temperature of 50°–60° C. The sulfurization agent is added into the vessel, ammonium sulfide being preferred in an amount needed theoretieally to precipitate $Mn^{2+}$. The reaction takes 20–30 minutes. Filtrate after the reaction, the remaining cake is manganese sulphide which can be recovered and used for the production of ammonium sulphide; the filtrate produced can go through carbonization step.

The main chemical reaction in this step is:

$$Mn^{2+} + (NH_4)_2S = MnS + 2NH_4^+$$

(3) Carbonization

The sulfurized solution is introduced into a vessel with an agitator and the gases released from the ore pulp reaction are introduced continuously. The main composition of the gases is NH₃ and CO₂. The reaction takes place under room temperature or heating conditions with a preference of 40°-60° C. and goes on continuously. The main component in remaining cakes after filtration is calcium carbonate, while the filtrate is ready for alkalization.

The main chemical reaction in this step is:

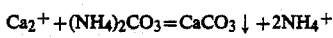

(4) Alkalization

The carbonized filtrate is pumped into a vessel with an agitator. The reaction takes place under heating conditions with the prefered temperature of 50°-60° C.

Alkaline materials are introduced into the filtrate with a preference of $NH_3-H_2O$ or $NH_3$. The amount of the alkaline added is just sufficient to adjust the pH of the filtrate to 10–12. Reaction time ranges from 10 min to 1 hour, the preferential time range is 20–30 min. Then it is filtrated. The remaining cake obtained contains mainly $Mg(OH)_2$, which can be further processed into MgO and other products. The filtrate is treated with acid to adjust its PH to neutral. It can be now used as regenerated solution. The preferential acids are HCl and HNO₃.

The main chemical reaction in this step is $Mg^{2+} + 2OH = Mg(OH)_2$.

The above-mentioned description is a complete process of phosphorus ore chemical separation of the present invention which includes all the steps.

However, for normal calcareous and calcareous-silicious colloidal phosphorus ore, the precise steps required can be decided on the basis of the composition of the phosphorus ores. Generally speaking, the ore pulp reaction and the carbonization reaction are the basic components of the present invention, they can either independently form a technological process or in combination with any one or two of the ammoniation, sulfurization and alkalization reactions to treat any particalar colloidal phosphorus ore in accordance to their actual requirements.

DESCRIPTION OF THE DRAWING

Herewithin enclosed a flow diagram of the invention, The following are the explanations of the diagram:
 Filtrate (I) is the filtrate from the ore pulp reaction,
 Filtrate (II) is the filtrate from the ammoniation;
 Filtrate (III) is the filtrate from the vulcanization,
 Filtrate (IV) is the regeneration solution from the carbonization
 Filtrate (V) is the regeneration solution from the alkalization.

The thick solid lines indicate the whole process is a continuous process.

The twin spots center lines represent various regeneration steps which can be operated uncontinuously.

The dotted lines represent gases released from decomposition in the reaction.

The following examples are provided for further elucidation of the present invention which, however, is not confined thereto

EXAMPLE 1

The source of the ore sample: phosphorus ore from Cha Dian, Shaanxi Province, China.

The chemical conposition of the original ore (%): P₂O₅: 20.47, CaO: 38.08, MgO: 5.47, Fe₂O₃: 1.82, Al₂O₃: 1.71, SiO₂: 10.47, MnO: 2.41.

The inplementing method:

1. Ore pulp reaction: 1000 g-100 W original ore powder and 6,500 g ammonium salts solution at a concentration of 18% (the weight ratio between NH₄Cl and NH₄NO₃ being 4.3:1) were used to prepare ore pulp and put it into a vessel, with agitation. The temperature was increased to 140° C., operation pressure 2 Kg/cm². After a reaction time of 60 minutes, the product was filtered, the remaining cake was phosphorus concentrate; the filtrate and NH₃, CO₂ gases released during the reaction were delivered and treated in the solution regeneration step.

2. Solution regeneration:

(1) ammoniation: the filtrate from the ore pulp reaction was pumped into the ammoniation vessel; with agitation the temperature was raised to 50° C., added Ca(ClO)₂ (the quantity being 100% of the theoretical quantity needed to oxide Fe²⁺ ion), and kept at this temperature for 10 minutes. Aqueous ammonia was then added to adjust the pH to 7–8 and the reaction allowed to proceed for 30 minutes. The product recovered was then filtered and the remaining cake comprising Fe(OH)₃ and Al(OH)₃ was taken for further utilization and the filtrate taken for sulfurization.

(2) Sulfurization filtrate from the ammoniation stage was pumped into the sulfurization vessel: with agitation and the temperature raised to 55° C., (NH₄)₂S (the quantity being 105% of the theoretical quantity needed by the Mn²⁺ ion) was added and left for 25 minutes. The precipitated MnS may be processed into manganese products and for (NH₄)₂S regeneration; the filtrate may be passed on for carbonization.

(3) Carbonization: filtrate from the sulfurization stage was pumped into the carbonization vessel, with agitation and the temperature raised to 40° C., NH₃ and CO₂ gases released from the ore pulp reaction were caused to flow into the vessel for carbonization. This reaction could work in conjunction with ore pulp reaction, filtrated, the remaining cake was crystal calium carbonate, the filtrate was sent for a alkalization.

(4) Alkalization: the filtrate from the was pumped into the alkalization vessel; with agitation and the temperature raised to 50° C., strong liquid ammonia was added to to adjust PH to 12 and after 30 min; the reaction mass was filtered, the remaining cake Mg(OH)₂ can be used for further processing into magnesium products, while the filtrate, after adding HCl to regulate its pH to 7, can be used again as regenerate solution.

The main products obtained from the example above and their specifications (average) are as follows:

| (1) phosphorus concentrate | | | | | | | | | |
|---|---|---|---|---|---|---|---|---|---|
| Weight on Dry Basis (g) | Chemical Composition (%) | | | | | | Phosphorum Recovery (%) | Calcium Removal (%) | Mognisium Removal (%) |
| | $P_2O_5$ | CaO | MgO | $Fe_2O_3$ | $Al_2O_3$ | MnO | | | |
| 661.07 | 30.81 | 42.75 | 0.47 | 1.02 | 1.14 | 0.43 | 99.42 | 86.27 | 94.31 |

| (2) Manganese sulphide (Calculated as MnO) | | | | | |
|---|---|---|---|---|---|
| Weight Dry Basis (g) | Chemical Composition (%) | | | | Manganese Recovery (%) |
| | MnO | CaO | MgO | $Fe_2O_3$ | |
| 15.70 | 60.03 | 3.97 | 0.48 | 1.01 | 65.15 |

| (3) Crystal Calcium Carbonate | | | | | | |
|---|---|---|---|---|---|---|
| Weight on Dry Basis (g) | Chemical Composition (%) | | | | | Calcium Recovery (%) |
| | CaO | MgO | $Fe_2O_3$ | $Al_2O_3$ | MnO | |
| 158.65 | 51.43 | 1.64 | 0.51 | — | — | 91.77 |

| (4) Magnesium Oxide | | | | | |
|---|---|---|---|---|---|
| Weight on Dry Basis (g) | Chemical Composition (%) | | | | Magnisium Recovery (%) |
| | MgO | CaO | $Fe_2O_3$ | $Al_2O_3$ | |
| 37.38 | 94.88 | 1.93 | 0.44 | — | 72.45 | could be further processed for manganese products and $(NH_4)_2S$ regeneration. The filtrate was passed on for carbonization.

(2) Carbonization: the filtrate from the sulfurization was pumped into the carbonization vessel, with agitation and the temperature raised to 40° C., $NH_3$ and $CO_2$ gases from the ore pulp reaction were introduced continuously. This reaction could be undertaken in conjunction with the ore pulp reaction, filtrated, the remaining cake was $CaCO_3$ crystal, while filtrate was sent out for alkalization.

(3) Alkalization: the filtrate from the carbonization was pumped into the alkalization vessel, with agitation, the temperature raised to 50° C., and strong liquid ammonia (25% concentration) added to adjust its pH to 12 (end point). The total reaction time was 30 min; filtrated, the remaining cake $Mg(OH)_2$ might be used for processing into magnesium products, while the filtrate, after being adjusted to pH 7–8 by adding $HNO_3$, could be reused as regenerated solution.

The main products obtained form the present example and their specifications (average values) are as follows:

| (1) phosphorus concentrate | | | | | | | | | |
|---|---|---|---|---|---|---|---|---|---|
| Weight on Dry Basis (g) | Chemical Com. (%) | | | | | | phosphorus Recovery (%) | Calcium Removal (%) | Magnisium Removal (%) |
| | $P_2O_5$ | CaO | MgO | $Fe_2O_3$ | $Al_2O_3$ | MnO | | | |
| 556.77 | 30.071 | 43.98 | 1.01 | 1.43 | 0.62 | 0.56 | 99.12 | 90.05 | 92.84 |

EXAMPLE 2

Source of the ore sample; He Jia Yan phosphorus ore, Shaanxi Province, China.

Chemical composition of the original ore(%): $P_2O_5$: 17.25, CaO: 43.22, MgO: 7.46, $Fe_2O_3$: 0.82, $Al_2O_3$: 0.39, $SiO_2$: 3.44, MnO: 3.27.

Implementing method is as follows:

1. Ore pulp reaction: 1000 g 100 W original ore powder and 6700 g mixed ammonium salts solution (weight ration being 4::1 between $NH_4Cl$ and $NH_4NO_3$) at a concentration of 17.4% were mixed to prepare ore pulp and introduced into a vessel, with agitation. The temperature was raised to 105° C. The reaction lasted for 6 hours under normal pressure. The reaction mass was then filtered. The remaining filtered cake was phosphorus ore concentrate, while the filtrate and the $NH_3$ and $CO_2$ gases released during the reaction are treated in the solution regeneration step.

2. Solution regeneration (1) Sulfurization: the filtrate from the ore pulp reaction was pumped into the sulfurization vessel, with agitation, and the temperature raised to 55° C. $(NH_4)S$ (the quantity being 105% of the quantity needed theoretically by the $Mn^{2+}$) was added. After the reaction had proceeded for 25 minutes, the reaction product was filtered, the remaining cake comprising MnS which

| (2) Manganese Sulphide (calculated as MnO) | | | | | |
|---|---|---|---|---|---|
| Weight on Dry Basis (g) | Chemical Composition (%) | | | | Manganese Recovery (%) |
| | MnO | CaO | MgO | $Fe_2O_3$ | $Al_2O_3$ | |
| 20.18 | 59.46 | 4.74 | 0.33 | 1.92 | — | 68.02 |

| (3) Crystal calcium carbonate | | | | | | |
|---|---|---|---|---|---|---|
| Weight on Dry Basis (g) | Chemcial Composition (%) | | | | | Calcium Recovery (%) |
| | CaO | MgO | $Fe_2O_3$ | $Al_2O_3$ | MnO | |
| 322.20 | 53.87 | 1.77 | 0.45 | — | — | 97.38 |

| (4) Magnisium Oxide | | | | | |
|---|---|---|---|---|---|
| Weight on Dry Basis (g) | Chemical Composition (%) | | | | Magnisium Recovery (%) |
| | MgO | CaO | $Fe_2O_3$ | $Al_2O_3$ | |
| 46.78 | 94.64 | 1.83 | 0.71 | — | 67.82 |

EXAMPLE 3

Source of ore sample: he Jia Yan phosphurus ore, Shaanxi Province, China.

Chemical composition of the original ore (%), $P_2O_5$: 17.25, CaO: 43.22, MgO: 7.46, $Fe_2O_3$: 0.82, $Al_2O_3$: 0.93, $SiO_2$: 3.44, MnO: 3.23

The implementing method is as follows:

1. Ore pulp reaction: 1000 g of 100 W original ore powder and 6,500 g of 16.50% concentration mixed ammonium salt solution (the weigh ratio between $NH_4Cl$ and $NH_4NO_3$ being 4:1) were used to prepare ore pulp and tranfered into a reaction vessel, with agitation and the temperature raised to 140° C., under pressure of 2 kg/cm². The reaction lasted for 4 hours, then filtered, the remaining cake was phosphorus concentrate, which the filtrate and $NH_3$, $CO_2$ gases released during reaction were dilivered for further treatment in the solution regeneration step.

2. Solution regeneration (1) Sulfurization: the filtrate from the ore pulp reaction was pumped into the sulfurization vessel, with agitation, the temperature to 55° C. and added raised $(NH_4)_2S$ added (the quantity being 105% of that needed theoretically by the $Mn^{2+}$). The reaction lasted for 25 min, and the reaction mass was then filtered; the remaining cake could be further processed into manganese products and for $(NH_4)_2S$ regeneration, while the filtrate was delivered to carbonization step.

(2) Carbonization: the filtrate after the sulfurization was pumped into the carbonization vessel, with agitation and the temperature raised to 40° C., $NH_3$ and $CO_2$ gases released from the ore pulp reaction were introduced continously for cabonization.

The reaction could work in conjunction with the ore pulp reaction, filtrate, the remaining cake was $CaCO_3$ crystal, while the filtrate was sent out for alkalization.

(3) Alkalization: the filtrate from the carbonization was pumped into the alkalization vessel, with agitation and the temperature raised to 50° C. Strong liquid ammonia (25% concentration) was added to regulate pH to 12 (end point). The total reaction time lasted for 30 min, and the reaction mass was filtered. The remaining cake $Mg(OH)_2$ could be further processed into magainisium products, the filtrate, after adding $HNO_3$ to regulate its PH to 7-8, could then be used are regenerated solution The main products otained from the present example and their specifications (average values) are as follows:

| | (1) phosphorus concentrate | | | | | | | | |
|---|---|---|---|---|---|---|---|---|---|
| Weight on Dry Basis (g) | Chemical Composition (%) | | | | | | phosphorus Recovery (%) | Calcium Removal (%) | Magnisium Removal (%) |
| | $P_2O_3$ | CaO | MgO | $Fe_2O_3$ | $Al_2O_3$ | MnO | | | |
| 558.43 | 30.72 | 43.76 | 0.83 | 1.51 | 0.72 | 0.44 | 99.45 | 90.67 | 95.78 |

| | (2) Manganese Sulphide (calculated as MnO) | | | | | |
|---|---|---|---|---|---|---|
| Weight on Dry Basis (g) | Chemical Composition (%) | | | | | Manganese Recovery (%) |
| | MnO | CaO | MgO | $Fe_2O_3$ | $Al_2O_3$ | |
| 23.02 | 60.04 | 5.12 | 0.74 | 1.83 | — | 69.11 |

| | (3) Calcium sulphide crystal | | | | |
|---|---|---|---|---|---|
| Weight on Dry Basis (g) | Chemical Composition (%) | | | | Calcium Recovery (%) |
| | CaO | MgO | $Fe_2O_3$ | $Al_2O_3$ | |
| 303.89 | 54.51 | 2.03 | 0.51 | — | 91.17 |

| | Magnesium Oxide | | | | |
|---|---|---|---|---|---|
| Weight Dry Basis (g) | Chemical Composition (%) | | | | Magnicium Recovery (%) |
| | MgO | CaO | $Fe_2O_3$ | $Al_2O_3$ | |
| 48.15 | 94.88 | 2.03 | 0.57 | — | 68.82 |

EXAMPLE 4

Source of ore sample: He He Jia Yan phosphorus ore, Shaanxi Province, China.

Chemical composition of the original ore (%): $P_2O_5$: 17.25, $\overline{CaO}$: 43.22, MgO: 7.46, $Fe_2O_3$: 0.82, $Al_2O_3$: 0.39, $SiO_2$: 3.44, MnO: 3.27.

Implementing methods are as follows:

1. Ore pulp reaction: 1000 g of 100 W original ore powder and 6000 g, 16% concentration mixed ammonium salt solution (the weight ratio between $NH_4Cl$ and $NH_4NO_3$ being 4:1) were used to prepare ore pulp and put it into the vessel, with agitation and the temperature raised to 180° C., operation pressure 6 kg/cm², and reacted for 80 min. The reaction mass was filtered the remaining cake was phosphorus concentrate products, while the filtrate and the $NH_3$ and $CO_2$ gases released during reaction were sent out for treatment in the solution regeneration step.

2. Solvent regeneration (1) Sulfurization the filtrate from the ore pulp reaction was pumped into the sulfurization vessel, with agitation and the temperature raised to 55° C. $(NH_4)_2S$ (105% of the quantity required theoretically by $Mn^{2+}$), was added and reacted for 25 minutes. The reaction mass was then filtered. The remaining cake could be used for further processing into manganese products and also for $(NH_4)_2S$ regeneration, while the filtrate was sent out for carbonization.

(2) Carbonization: the filtrate from the sulfurization stage was pumped into carbonization vessel, with agitation and raised the temperature to 40° C., and $NH_3$ and $CO_2$ gases released from the ore pulp reaction introduced continuously. This reaction could work in conjunction with the ore pulp reaction, filtrated, the remaining cake was $CaCO_3$ crystal, while the filtrate was sent out for alkalization.

(3) alkalization: the filtrate from the carbonization was pumped into the alkalization vessel, with agitation and the temperature raised to 50° C., and strong liquid ammonia (25% concentration) added regulate its pH to 12 (end point). The mass was reacted for a total of 30 minutes and then filtered. The remaining cake $Mg(OH)_2$ could be used for further producing into magnisium products, while the filtrate, after adding $HNO_3$ to adjust its pH to 7-8, could then be used as regenerated solution.

The main products obtained from the present example and their specifications are as follows:

| (1) phosphorus concentrate | | | | | | | | | |
|---|---|---|---|---|---|---|---|---|---|
| Weight on Dry Basis (g) | Chemical Composition (%) | | | | | | phosphorus Recovery (%) | Calcium Removal (%) | Magnisium Removal (%) |
| | $P_2O_5$ | CaO | MgO | $Fe_2O_3$ | $Al_2O_3$ | MnO | | | |
| 556.84 | 30.81 | 42.94 | 0.71 | 1.62 | 0.57 | — | 99.45 | 93.20 | 94.25 |

| (2) Manganese sulphide (Calculated as MnO) | | | | | | |
|---|---|---|---|---|---|---|
| Weight on Dry Basis (g) | Chemical Composition (%) | | | | | Manganese Recovery (%) |
| | MnO | CaO | MgO | $Fe_2O_3$ | $Al_2O_3$ | |
| 22.83 | 59.44 | 5.01 | 0.63 | 1.74 | — | 67.93 |

| (3) Calcium Carbonate | | | | | | |
|---|---|---|---|---|---|---|
| Weight on Dry Basis (g) | Chemical Composition (%) | | | | | Calcium Recovery (%) |
| | CaO | MgO | $Fe_2O_3$ | $Al_2O_3$ | MnO | |
| 322.07 | 54.07 | 1.85 | 0.25 | — | — | 94.00 |

| Magnesium Oxide | | | | | |
|---|---|---|---|---|---|
| Weight on Dry Basis (g) | Chemical Composition (%) | | | | Magnesium Recovery (%) |
| | MgO | CaO | $Fe_2O_3$ | $Al_2O_3$ | |
| 48.05 | 95.12 | 1.78 | 0.67 | — | 68.34 |

EXAMPLE 5

The source of ore sample: Da Tang phosphorus ore, Guizhou Province, China.

Chemical composition of the original ore(%): $P_2O_5$: 21.86, CaO: 43.00, MgO: 8.70, $Fe_2O_3$: 0.5, $Al_2O_3$: 0.57, $SiO_2$: 3.71.

The implementing methods are as follows:

1. Ore pulp reaction: 1000 g of 100 W original ore powder and 6600 g 17% concentration mixed ammonium salt solution (the weight ratio among $NH_4Cl$, $NH_4NO_3$ and $(NH_4)_2HPO_4$ being 3.6:1:0.1) were used to prepare one pulp and put into the reaction vessel, with agitation and the temperature raised to 180° C., operation pressure 6 kg/cm². The reaction continued for 60 minutes and the reaction product was then filtered. The remaining cake was phorphorus concentrate, while the filtrate and the $NH_3$ and $CO_2$ gases released during the reaction were sent out for treatment in the solution regeneration step:

2. solution regeneration (1) Carbonization: Pumped the filtrate from the ore pulp reaction was pumped into the carbonization vessel, with agitation and the temperature raised to 40° c., $NH_3$ and $CO_2$ gases released from the ore pulp reaction. This reaction were introduced continuously could work in conjunction with the ore pulp reaction; filtrated, the remaining cake was $CaCO_3$ crystal, while the filtrate was sent out for alkalization.

(2) Alkalization: the filtrate from the carbonization was pumped into the alkalization vessel, with agitation and the temperature raised to 50° c., strong liquid ammonia (concentration 25%) was added to readjust its pH to 12 (end point). After reaction for 30 minutes, the reaction mass was filtered. The remaining cake $Mg(OH)_2$ could be used to further process into magnesium products, while the filtrate, after adding $HNO_3$ to adjust its PH to 7 8, would then be used as regenerated solution.

The main products obtained from the present example and their specifications (average values) are as follows:

| (1) phosphorus concentrate | | | | | | | | | |
|---|---|---|---|---|---|---|---|---|---|
| Weight on Dry Basis (g) | Chemical Composition (%) | | | | | | phosphorus Recovery (%) | Calcium Removal (%) | Magnisium Removal (%) |
| | $P_2O_5$ | CaO | MgO | $Fe_2O_3$ | $Al_2O_3$ | — | | | |
| 594.74 | 36.46 | 50.16 | 0.43 | 0.52 | 0.27 | — | 99.19 | 90.93 | 97.06 |

| (2) Calcium carbonate crystal | | | | | |
|---|---|---|---|---|---|
| Weight on Dry Basis (g) | Chemical Composition (%) | | | | Calcium Recovery (%) |
| | CaO | MgO | $Fe_2O_3$ | $Al_2O_3$ | |
| 237.22 | 49.34 | 1.67 | 0.21 | — | 96.00 |

| (3) Magnesium Oxide | | | | | |
|---|---|---|---|---|---|
| Weight Dry Basis (g) | Chemical Composition (%) | | | | Mangnisium Recovery (%) |
| | MgO | CaO | $Fe_2O_3$ | $Al_2O_3$ | |
| 52.73 | 95.07 | 1.77 | — | — | 62.44 |

EXAMPLE 6

The source of the ore sample: Mo Ping phosphorus ore, Giuzhou Province, China.

Chemical composition of the original ore(%): $P_2O_5$: 30.69, CaO: 48.41, MgO: 2.82, $Fe_2O_3$: 0.79, $Al_2O_3$: 0.29.

The implementing methods are as follows:

1. Ore pulp reaction: 1000 g of 80 W orignunal ore powder and 6000 g 14.5% concentration mixed ammonium salt solution (the weight ratio between $NH_4Cl$ and $NH_4NO_3$ being 5.6:1) were used to prepare ore pulp and put into reaction vessel; with agitation and the temperature raised to 105° C., reacted under normal pressure for 24 hours; the product was filtered, the remaining cake was phosphorus concentrate, while the filtrate and the $NH_3$ and $CO_2$ gases released during the reaction would be sent out for treatment in the solution regeneration step.

2. Solution regeneration

Carbonization: the filtrate from the reaction was pumped into the carbonization vessel, with agitation and the temperature raised to 40° c., $NH_3$ and $CO_2$ gases released during the ore pulp reaction were introduced continuously for carbonization. This reaction worked in conjunction with the ore pulp reaction, filtered, the remaining cake was $CaCO_3$ crystal, while the filtrate could then be reused as regenerated solution.

The main products obtained from the present example and their specifications (average values) are as follows:

| Weight on Dry Basis (g) | (1) phosphorus concentrate | | | | | phosphorus Recovery (%) | Calcium Removal (%) | Magnisium Removal (%) |
|---|---|---|---|---|---|---|---|---|
| | Chemical Composition (%) | | | | | | | |
| | $P_2O_5$ | CaO | MgO | $Fe_2O_3$ | $Al_2O_3$ | | | |
| 856.54 | 35.61 | 50.03 | 0.62 | 0.74 | 0.27 | 99.39 | 65.28 | 81.37 |

| Weight on Dry Basis (g) | (2) Calcium carbonate crystal | | | | Calcium Recovery (%) |
|---|---|---|---|---|---|
| | Chemical Composition | | | | |
| | CaO | MgO | $Fe_2O_3$ | $Al_2O_3$ | |
| 91.32 | 52.42 | 1.66 | 0.51 | — | 96.40 |

EXAMPLE 7

The source of ore sample: Mo Ping phosphorus ore, Gui-Zhou Province, China.

Chemical composition of the original ore (%): $P_2O_5$: 30.69, CaO: 48.41, MgO: 2.82, $Fe_2O_3$: 0.79, $Al_2O_3$: 0.29.

The implementing methods are as follows:

1. Ore pulp reaction: 1000 g of −80 W original ore powder and 6000 g 14.5% concentration mixed ammonium salt solution (the weight ratio between $NH_4Cl$ and $NH_4NO_3$ being 5.6:1) were used to prepare ore pulp and put into the reaction vessel; with agitation and the temperature raised to 140° C., reacted under 2 kg/cm² pressure for 60 min.. the product was filtered. The remaining cake was phosphorus concentrate, the filtrate and the $NH_3$, $CO_2$ gases released during the reaction was sent out for treatment in the solution regeneration step.

2. Solution regeneration

Carbonization: pumped the filtrated from the ore pulp reaction was pumped into the cabonization vessel; with agitation and the temperature raised to 40° C., $NH_3$ and $CO_2$ gases released during the ore pulp reaction were introduced continuously for carbonization; This reaction could work in conjunction with the ore pulp reaction, filtrated, the remaining cake was $CaCO_3$ crystal, while the filtrate could be reused as regenerated solution.

The main products obtained from the present example and their specifications (average values) are as follows:

| Weight on Dry Basis (g) | (1) phosphorus concentrate | | | | | phosphorus Recovery (%) | Calcium Removal (%) | Magnisium Removal (%) |
|---|---|---|---|---|---|---|---|---|
| | Chemical Composition (%) | | | | | | | |
| | $P_2O_3$ | CaO | MgO | $Fe_2O_3$ | $Al_2O_3$ | | | |
| 856.40 | 35.79 | 50.14 | 0.58 | 0.72 | 0.22 | 99.86 | 65.75 | 82.54 |

| Weight on Dry Basis (g) | (2) Calcium carbonate crystal | | | | Calcium Recovery (%) |
|---|---|---|---|---|---|
| | Chemical composition | | | | |
| | CaO | MgO | $Fe_2O_3$ | $Al_2O_3$ | |
| 91.60 | 51.38 | 1.51 | 0.46 | — | 95.79 |

EXAMPLE 8

The source of the ore sample: Mo Ping phosphours ore, Guizhou province, China.

The chemical composition of the original ore(%): $P_2O_5$: 30.69, CaO: 48.41, MgO: 2.82, $Fe_2O_3$: 0.79, $Al_2O_3$: 0.29.

The implementing methods:

1. Ore pulp reaction: 1000 g of −80 W original ore powder and 6000 g 14.5% concentration mixed ammonium salt solution (weight ratio between $NH_4Cl$ and $NH_4NO_3$ being 5.6:1) were used to prepare ore pulp and put it into reaction vessel; with agitation and the temperature is raised to 180° C. Reaction was carried out under the pressure of 6 kg/cm² for 30 minutes. The product was filtered, The remaining cake was phosphorus concentrate, while the filtrate and the $NH_3$ and $CO_2$ gases released during the reaction could be sent out for treatment in the solution regeneration step.

2. Solution regeneration:

Carbonization, the filtrate from the ore pulp reaction was pumped into the carbonization vessel; with agitation and the temperature raised to 40° C., $NH_3$ and $CO_2$ gases released during the ore pulp reaction introduced continuously for carbonization. The reaction could work in conjunction with the ore pulp reaction; filtered, the remaining cake was the $CaCO_3$ crystal, the solution could be reused as regenerated solution.

The main products obtained from the present example and their specifications (average values) are as follows:

| (1) phosphorus concentrate | | | | | | | |
|---|---|---|---|---|---|---|---|
| Weight on Dry Basis (g) | Chemical Composition (%) | | | | | phosphorus Recovery (%) | Calcium Removal (%) | Magnesium Removal (%) |
| | $P_2O_5$ | CaO | MgO | $Fe_2O_3$ | $Al_2O_3$ | | | |
| 855.77 | 35.80 | 49.74 | 0.48 | 0.81 | 0.27 | 99.87 | 66.53 | 85.42 |

| (2) Calcium carbonate crystal | | | | | | |
|---|---|---|---|---|---|---|
| Weight on Dry Basis (g) | Chemical Composition (%) | | | | | Calcium Recovery (%) |
| | CaO | MgO | $Fe_2O_3$ | $Al_2O_3$ | — | |
| 90.83 | 52.06 | 1.93 | 0.51 | — | — | 95.47 |

What is claimed is:

1. A process for chemically refining phosphorus ore which comprises the following steps:
   (a) reacting an aqueous mixture of ammonium chloride and ammonium nitrate in a weight ratio of 0.5–10:1 having a concentration of 5–25% by weight with phosphorus ore powder of −20 mesh to −200 mesh in an ore pulp reaction with 1:2–10 weight ratio of phosphorus ore powder to the aqueous mixture of ammonium chloride and nitrate at a temperature of at least 60° C. for at least 10 minutes to produce solid phosphate concentrate, liquid solution of metal salts and ammonia and carbon dioxide containing gas products;
   (b) introducing continuously the gases obtained from step (a) into a calcium ion-containing filtrate obtained directly or indirectly from the ore pulp reaction, said introduction being effected at a temperature of at least 40° C. to bring about carbonization to precipitate the calcium content of the filtrate as calcium carbonate.

2. The process of claim 1, wherein said mixed ammonium salts aqueous solution is in a concentration of 12 to 20% (by weight).

3. The process of claim 1, wherein the ratio (by weight) of $NH_4Cl$ to $NH_4NO_3$ is 3–5:1.

4. The process of claim 1, wherein in step (a) the granulation of said phosphorus ore powder is between −50 W and −150 W.

5. The process of claim 4, wherein said granulation of said phosphorus ore powder is between −80 W and −100 W.

6. The process of claim 1, wherein said weight ratio of phosphorus ore powder to mixed aqueous ammonium salts solution is 1:5–8.

7. The process of claim 1, wherein in step (a) the reaction temperature is between 100° and 200° C.

8. The process of claim 7, wherein said reaction temperature is between 140° and 180° C.

9. The process of claim 1, wherein in step (a) said reaction is carried out under boiling condition.

10. The process of claim 1, wherein in step (a) said reaction time is between 0.5 and 4 hours.

11. The process of claim 1, wherein in step (b) said reaction temperature is between 40° and 60° C.

12. The process of claim 1, wherein in step (b) said gases introduced are $NH_3$ and $CO_2$.

13. The process of claim 1 wherein in step (b) said reaction is carried out while undergoing stirring.

14. A process as claimed in claim 1, wherein said phosphorus ore is selected from calcareous and calcareous-siliceous colloidal phosphorus ore.

15. A process as claimed in claim 14, wherein said ore comprises at least one of dolomite, calcite, and iron, aluminum and manganese oxides.

16. The process of claim 1, wherein the process further comprises at least one of the following steps:
   (i) prior to carbonization, adding an oxidizing agent to the separated filtrate obtained from step (a) at a temperature of at least 50° C. to convert $Fe^{2+}$ in the filtrate into $Fe^{3+}$ while undergoing mixing and after the reaction, adding a suitable amount of aqueous ammonia to adjust the pH value of the reaction solution to 7–8 to bring about ammoniatization to form a precipitate comprising $Fe(OH)_3$ and $Al(OH)_3$;
   (ii) prior to carbonization, adding ammonium sulphide to the ammoniated filtrate at a temperature of at least 50° C. while undergoing mixing to bring about sulfurization;
   (iii) after carbonization, adding an alkaline material to the sulfurized filtrate at a temperature of at least 50° C. to adjust the pH value of the filtrate to 10–12 while undergoing mixing, to form a magnesium-containing precipitate and after filtration an acid is added to adjust the pH value of the regenerated solution to 7–8.

17. The process of claim 16, wherein said process includes step (i) and in step (i) the said reaction temperature is between 50° and 60° C.

18. The process of claim 16, wherein said process includes step (i) and in step (i) the said oxidizing agent added to $Ca(ClO)_2$.

19. The process of claim 16, wherein said process includes step (i) and in step (i) the amount of $Ca(ClO)_2$ added is that needed theoretically by the oxidation of $Fe^{2+}$ ion.

20. The process of claim 16, wherein said process includes step (i) and in step (i) the stirring speed is between 70 and 80 r.p.m.

21. The process of claim 16, wherein said process includes step (i) and in step (i) the said reaction time after adding $NH_4OH$ is from 20 to 40 minutes.

22. The process of claim 16, wherein said process includes step (ii) and in step (ii) the said temperature is between 50° and 60° C.

23. The process of claim 16, wherein said process includes step (ii) and in step (ii) said reaction time of sulfurization is between 20 and 30 min.

24. The process of claim 16, wherein said process includes step (ii) and in step (ii) said amount of ammonium sulphide added is that required theoretically to precipitate $Mn^{2+}$ ion.

25. The process of claim 16, wherein said process includes step (iii) and in step (iii) said reaction temperature is between 50° and 60° C.

26. The process of claim 16, wherein said process includes step (iii) and in step (iii) said alkaline material is selected from the group consisting of $NH_4OH$ and $NH_3$.

27. The process of claim 16, wherein said process includes step (iii) and in step (iii) the reaction time is between 20 and 30 min.

28. The process of claim 16, wherein said process includes step (ii) and in step (iii) said acid is selected from the group consisting of HCl and HNO$_3$.

29. The process of claim 16, wherein at least two of steps (i), (ii) and (iii) are employed to form a processing method for a particular colloidal phosphorus ore.

30. The process for chemically refining phosphorus ore comprises the following steps:
   (a) reacting an aqueous mixture of ammonium chloride and ammonium nitrate in a weight ratio of 0.5–10:1 having a concentration of 5–25% by weight with phosphorus ore powder of between −20 mesh and −200 mesh in an ore pulp reaction with 1:2–10 weight ratio of phosphorus ore powder to the aqueous mixture of ammonium chloride and nitrate at a temperature of at least about 60° C. while undergoing mixing for at least 10 minutes to produce solid, liquid and gas products and then filtering off the phosphate solid;
   (b) adding an oxidizing agent into the separated filtrate at a temperature of at least 50° C. to convert Fe$^{2+}$ in the filtrate into Fe$^{3+}$ while undergoing mixing and after the reaction, adding a suitable amount of aqueous ammonia to adjust the pH value of the reaction solute to 7–8 and to bring about ammoniatization as to form a precipitate comprising Fe(OH)$_3$ and Al(OH)$_3$, then filtering;
   (c) adding ammonium sulphide into the ammoniated filtrate at a temperature of at least 50° C. to bring about sulfurization;
   (d) introducing continuously the gases obtained from step (a) into the sulfurized filtrate at a temperature of at least 50° C. to bring about carbonization;
   (e) adding alkali into the carbonized filtrate at a temperature of at least 50° C. to adjust the pH value of the filtrate to 10–12 while undergoing mixing to bring about a reaction to form a magnesium-containing precipitate, after filtration an acid is added to adjust the pH value of the regenerated solution to 7–8.

* * * * *

UNITED STATES PATENT AND TRADEMARK OFFICE
CERTIFICATE OF CORRECTION

PATENT NO. : 4,793,979

DATED : December 27, 1988

INVENTOR(S) : Wenxing Lu

It is certified that error appears in the above-identified patent and that said Letters Patent is hereby corrected as shown below:

Title page, item (73) which reads

"Assignees: "Shaaxi" should read -- Shaanxi --.

Signed and Sealed this

Tenth Day of October, 1989

Attest:

DONALD J. QUIGG

Attesting Officer

Commissioner of Patents and Trademarks